United States Patent

Kapur et al.

[11] Patent Number: 6,051,027
[45] Date of Patent: Apr. 18, 2000

[54] EFFICIENT THREE DIMENSIONAL EXTRACTION

[75] Inventors: Sharad Kapur, Hudson County; David Esley Long, Morris County, both of N.J.; Jingsong Zhao, Santa Cruz County, Calif.

[73] Assignee: Lucent Technologies, Murray Hill, N.J.

[21] Appl. No.: 09/116,158

[22] Filed: Jul. 16, 1998

Related U.S. Application Data

[63] Continuation-in-part of application No. 08/904,488, Aug. 1, 1997.

[51] Int. Cl.$^7$ ........................................... G06F 17/50
[52] U.S. Cl. .................... 703/5; 703/13; 342/196; 367/135
[58] Field of Search ................ 395/500.26, 500.35, 395/500.03, 888, 183.09; 364/725.01, 808; 367/135; 703/5, 13; 342/25, 196

[56] References Cited

U.S. PATENT DOCUMENTS

| | | | |
|---|---|---|---|
| 5,471,435 | 11/1995 | Marschall | 367/135 |
| 5,588,032 | 12/1996 | Johnson et al. | 378/8 |
| 5,625,578 | 4/1997 | Du Cloux et al. | 364/578 |

*Primary Examiner*—Kevin J. Teska
*Assistant Examiner*—Thai Phan
*Attorney, Agent, or Firm*—E. Rosenthal; I. Ioneseu

[57] ABSTRACT

A layered structure is divided into a plurality of regions. Transmission line equivalents (Green's functions) in the spectral domain are formed between all regions within the layered structure. The spectral domain Greens' function are converted to the spatial domain using a near field and a far field computed for those regions part of a component within the layered structure. The far field is extracted from a compressed database computed from the transmission line equivalents and descriptive of the layered structure. The near field is computed using a prioritization mechanism. Priority is assigned in accordance with the amplitude of a source and the length of the path between regions of interest.

Once the physical characteristics of the layers used in the fabrication process of the IC are identified, the database used for computation of the far field is compiled and compressed, and remains unchanged for each new parameter extraction. Thus, compressed, layered Green's functions in the database decouple the computation of the far field from the layer structure and circuit geometry, minimizing computation time.

30 Claims, 2 Drawing Sheets

EFFICIENT THREE DIMENSIONAL EXTRACTION

CROSSREFERENCES

This application is a continuation in part of U.S. patent application Ser. No. 08/904,488, filed Aug. 1, 1997, titled Method and Apparatus for Designing Interconnections and Passive Components in Integrated Circuits and Equivalent Structures by Efficient Parameter Extraction.

FIELD OF INVENTION

This invention is in the field of simulation, or parameter extraction of characteristics of electrical elements used in the design of printed circuit boards, solid state integrated circuits and their packaging.

BACKGROUND OF THE INVENTION

Integrated circuits (IC) typically contain millions of electronic elements within a single device. Parameter extraction, or simulation, of the electronic elements within an IC prior to the manufacture of such a device is essential. Simulation of each electronic element, and its interaction with its neighbors, allows computation of circuit element values before the IC is built. ICs operating at frequencies in the range of gigahertz, where internal structures are submicron in size and may operate near resonance, require accurate "full-wave" simulation.

As described in the parent application, U.S. patent application Ser. No. 08/904,488, incorporated herein by reference in its entirety, historically, IC elements were computed from the geometry of an element within an IC by using general purpose, computer based field solver tools based on finite-difference or finite-element schemes. Typical of these tools is a requirement for volume discretization. Discretization means that the full volume of an IC element is divided in many smaller "discrete" volumes and/or surfaces, yielding a large number of points. These large number of points are descriptive as a whole of the discretized element. In general, solutions for electric and magnetic fields are computed for each point. The number of points, or the level of accuracy, or both, are increased until the computation of electric and magnetic fields for each point reaches a desired level of accuracy. Using this discretization approach, as frequencies go up, the number of points required for a practical "full wave" simulation also goes up, resulting in large computation time and memory use for the simulation. Since many simulations need to be conducted for the design of an IC, it is desirable to perform an extraction, or simulation, in as short a time as possible.

The prior art used simulation tools based on layered media integral equation formulations using direct solutions (such as Hewlett Packard—Momentum and Sonnet).

These are 2.5D simulators, typically used by the microwave and antenna communities. However, since these tools employ direct solution methods, they are restricted to relatively small problems. In addition, the equations that they are based on become ill-conditioned at lower frequencies, resulting in numeric difficulties in computing the results.

Yet another approach of the prior art for performing simulations is the use of integral equation methods using iterative solutions based on the fast multipole method. An example of this approach is "FastCap: A multipole accelerated 3-D capacitance extraction program" *IEEE Transaction on Computer Aided Design* 10(10):1447–1459, November 1991, incorporated herein by reference in its entirety. In general, this type of integral equation schemes work by introducing additional equations to enforce boundary conditions at region interfaces. The introduction of multiple equations for multiple boundary conditions can result in a prohibitive increase in problem size, again presenting problems with computation time and memory usage.

Another approach to solve parameter extraction problems is the use of layered Green's functions. These functions have traditionally been used in a 2.5 dimensional (2.5D) simulation context where the radiating sources are essentially planar. i.e., being confined to infinitely thin sheets. In some applications. 2.5D modeling of the structures is adequate because conductor thickness generally is much smaller than conductor width. However, in IC and packaging contexts planar modeling is generally insufficiently accurate. Physical shrinkage of IC geometry size, which is approaching submicron dimensions, dictates that the thickness of conductors within an IC is often on the same order as the conductor width. This physical characteristic of internal IC structures reduces the applicability of a strictly planar oriented approach by introducing substantial errors.

SUMMARY OF THE INVENTION

The above listed problems are avoided in accordance with one aspect of the invention, by a method and apparatus for simulating a component within a layered structure. The layers within the layered structure are generally radially invariant. The layered structure is divided into a plurality of regions. Transmission line equivalents. i.e., Green's functions, in the spectral domain are formed between all regions within the layered structure.

Interactions between the regions are computed using the Green's function. The Green's function is converted to the spatial domain. In accordance with an aspect of the invention, the conversion is done in one of two ways, depending on whether the distance between regions is close, i.e., a near field computation, or relatively farther apart, i.e. a far field computation.

A near field is computed using a prioritization mechanism. The priority is assigned in accordance with the amplitude of the source and the length of the path between regions of interest. The computation for each of two such regions is prioritized in accordance with this prioritization mechanism. The prioritization mechanism is implemented using a heap data structure.

A far field is computed by extracting data from a spatial domain database of precomputed Green's functions descriptive of the plurality of layers. Once the physical characteristics of the layers used in the fabrication process of the IC are identified, the Green's functions descriptive of the IC structure are defined and stored, thus remain unchanged for each new simulation, or parameter extraction. During the initial creation of a description of the layered structure, Green's function transmission line analogs are convolved with a Bessel function, and corrected with a polynomial after using adaptive Gaussian integration along a contour excluding the poles in the in spectral domain. A Fast Hankel transform converts results in the spectral domain to the spatial domain. Spatial domain results are interpolated using adaptive Chebychev and LaGrange methods to create the database.

Thus, compressed, layered Green's functions in the database decouple the computation of the far field from the layer structure and circuit geometry. The database contains the spectral to spatial transform of layer oriented Green functions that are precomputed, compressed and stored for subsequent, multiple use. Instead of computing the far field for each point in real time, the database is accessed, thus saving computation time.

DETAILED DESCRIPTION

Figure 2:
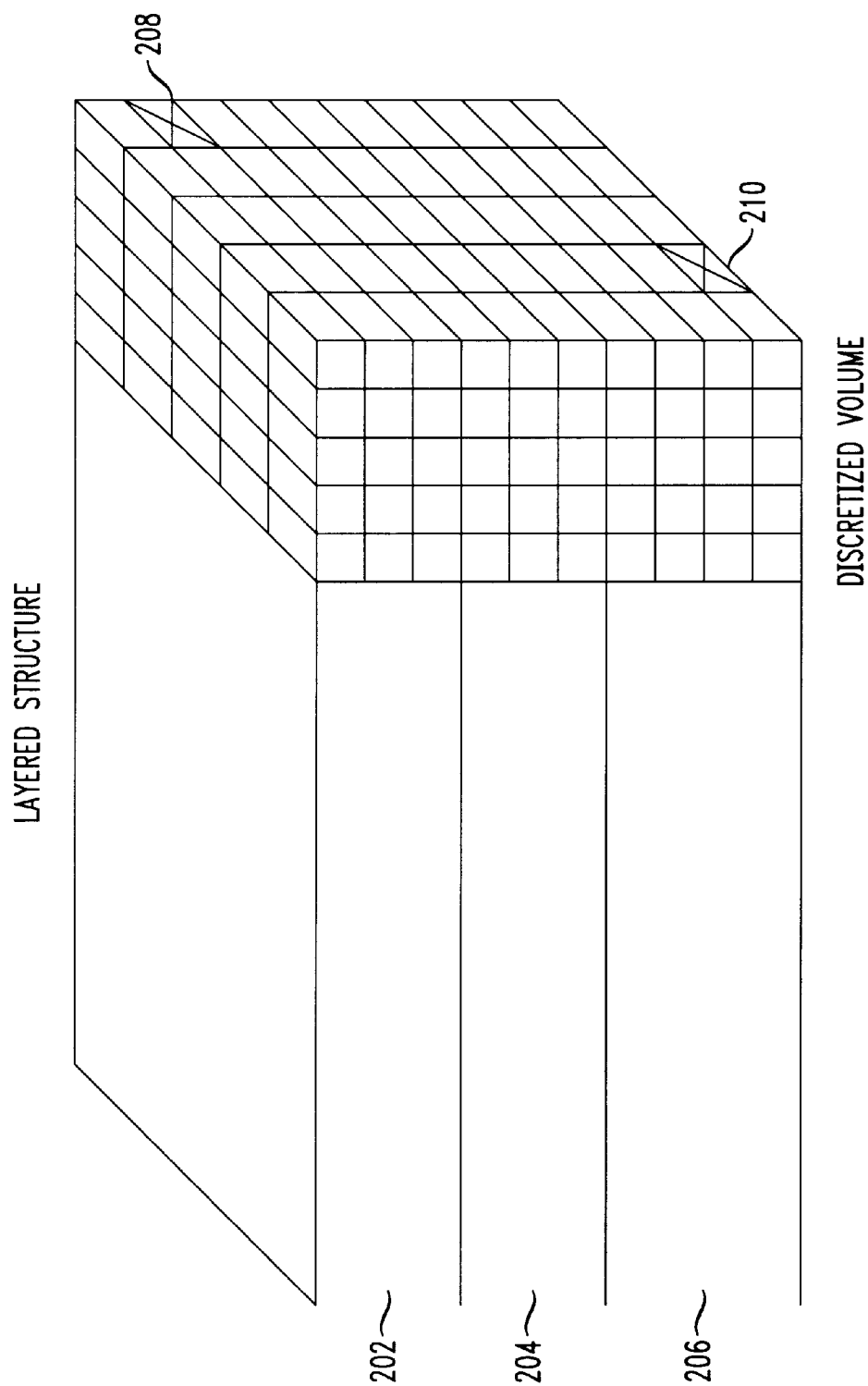
FIG. 2 is a layered structure showing discretized regions.

An overview of the method and apparatus used in the invention will be presented before describing the illustrative embodiments of each component of the design tool in accordance with this invention, In accordance with this invention, a structure to be modeled, as for example shown in FIG. 2, typically an IC component part of a multilayered structure, is first discretized into many parts. The discretization process divides the IC component and the layer structure it is formed on, into relatively small, individual parts. Typical of integral equation approaches is surface discretization. As shown in FIG. 2., layers 202, 204 and 206 make up a layered structure. A portion of the structure has been discretized into exemplary surface elements 208 and 210. Generally, the layered structure is naturally broken into regions based on variations in the material properties and the possible positions of conductors. The purpose of the discretization process is to approximate a large volume having unknown characteristics by a large number of points, each having known characteristics. Since each point used in the discretization process has known characteristics, each individual volume is represented as an entry in a multi dimensional, generally matrix based, integral system of equations. The process for arriving at the multi-dimensional system of equations descriptive of the component to be modeled is described in the referenced parent application. Within such a system of integral equations, a multi dimensional matrix M1 can be said to contain information descriptive of the layers forming a volume containing the IC element of interest in the spatial domain. It is desired to find $M1^{-1}$, the inverse of M1, i.e. the solution to the integral equations. The solution will allocate a certain parameter, typically an electric and/or magnetic field to each of the discretization points, such as 208 and 210. When the field for each discretization point making up an IC element is summed, the capacitance, inductance or other parameter of the element is computed.

Certain mathematical tools are required to solve the system of equations. Some of these well known tools are more efficient in the spectral domain. Hence, the system of integral equations is converted to and from the spectral domain. The spectral domain Green's functions are converted to the spacial domain to obtain the elements of M1.

Figure 1:
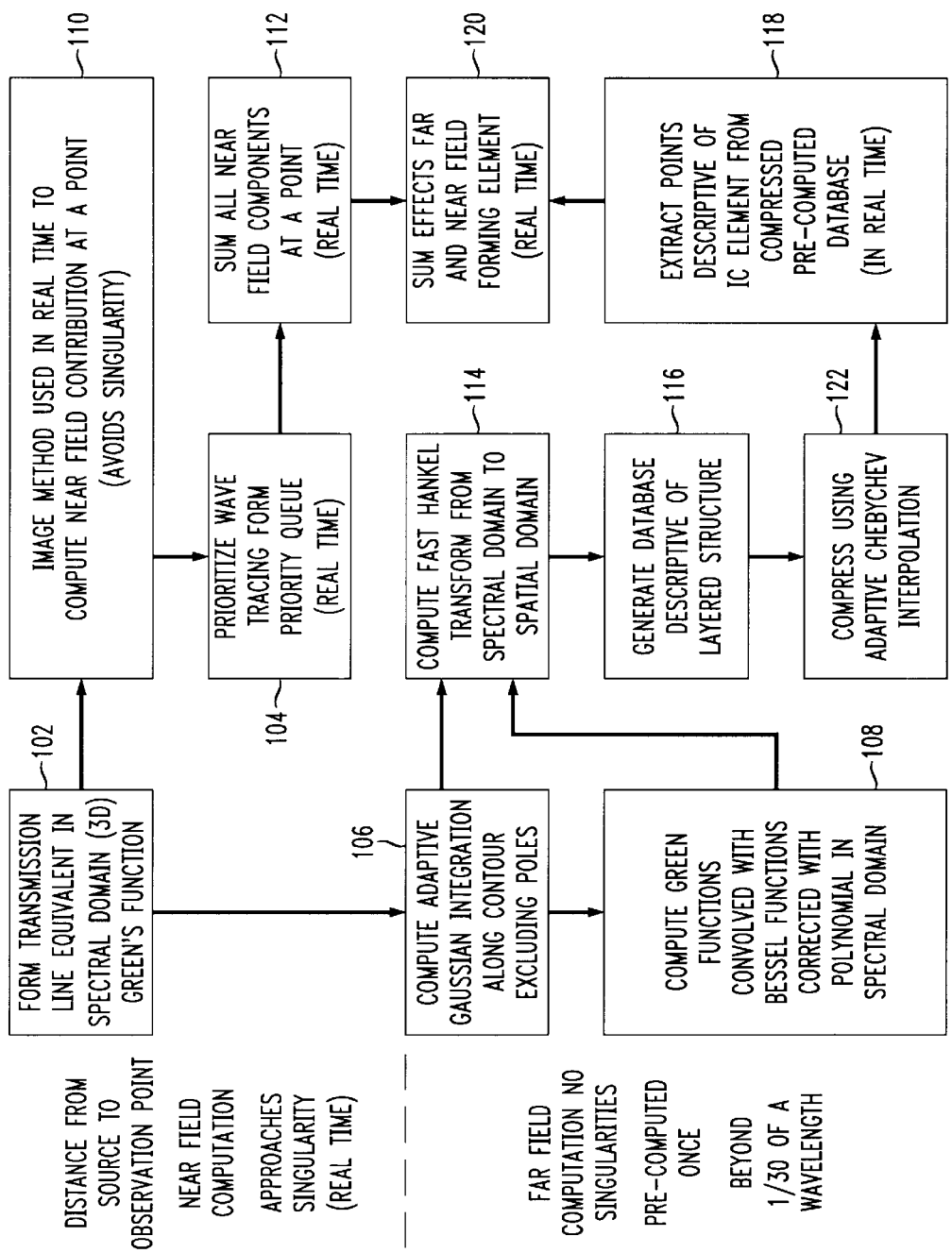
FIG. 1 is a flow diagram of the simulation method of the present invention.

As shown in FIG. 1, in block 102, a transmission line equivalent is formed to implement spectral domain Green's functions. This Green's function describes the relationship between, for example, element 210 and element 208 across layers 202, 204 and 206.

As another simplification, it was further observed that any source and observation points used to model an element of interest are generally confined on a number of radially invariant sheets, such as 202, 204 or 206 within the volume of interest. Applying this simplifying assumption, all possible sources and observation points, such as 208 and 210, within a volume can be modeled and their interactions precomputed on a sheet by sheet basis. Note that, in general, the Green's functions represent the relationship between two points, such as 208 and 210, deemed "source" and "observation" points in the (layered) structure.

The integral equations described herein are linear, and superposition applies. A source point can be viewed as merely a "beginning" for the Green's function while the observation point is the "end". The effects of each source to observation point interaction is independent of all others. Thus, a system of equations in the spectral domain, (i.e. Green's functions), can be chosen to represent the relationship between all possible "sources" (beginnings) and "observation points" (ends) within a layered structure at an arbitrary level of discretization.

However, certain sources and observation points located within 1/30 of a wavelength exhibit certain singularities in their spatial domain Green's function. These stem from certain near field effects due to proximity of the sources to the observation points. It is observed by the inventors that in order to simplify and render the computation of various fields more efficient, the effect of a source of energy and its proximity to an observation point within is to be divided into two distinct regions: a near field and a far field. The near field uses different mathematical tools for its solution as compared to the far field.

The near field is generally limited to distances approximating 1/30 of a wavelength from the source to the observation point location. A computational method, herein called the image method, shown in block 110, is applied for computing contributions from energy sources for distances up to 1/30 of a wavelength. Distances beyond 1/30 of a wavelength away from a source are designated the far field for purposes of this application.

It was further observed that the computational load for the image method increases geometrically for distances beyond approximately 1/30 of a wavelength. For regions beyond 1/30 of a wavelength, the image method is not used. Instead a database is generated descriptive of the layered structure as shown in block 116. This database is then compressed in accordance with this invention in block 122 so it can be used for any configuration of source and observation point in the far field.

The applicability and benefit of the compressed database becomes clear when it is understood that any IC element to be modeled within the modeled layered structure is made up of a plurality of source and/or observation points. The database contains all the source and observation points within a volume of interest. Since the database is compressed and precomputed, the computational load is limited to extracting the points descriptive of the element to be modeled. Thus it is fast. Furthermore, necessary modeling points for any subsequent element to be modeled within the layered structure are efficiently available and recyclable.

Once the interaction and effects of all possible source and observation points are computed for a layered structure, then an element for which a solution is desired is a portion of the precomputed solution set. Clearly, it is within the layered volume that a collection of such observation points will form any element. A plurality of source points can model, for example, a conductor, again part of the layered structure.

Hence, summing the near and far field effects at the points of interest descriptive of the element will yield the matrix M1 which is then solved to obtain the desired parameter extraction. The near field effects were obtained from the image method (block 110, 104 and 112) while the far field effects are read out, or extracted from a compressed database in block 122.

Having described the overall organization of the invention, each block will be now detailed.

1. Forming Green's function Transmission Line Equivalents in spectral domain.—Far and Near Field In FIG. 2, a three layered structure, having layers 202, 204 and 206 is shown. Source 210 in on layer 206 while observation point 208 in on layer 202.

Electromagnetic wave phenomena generated by source 210 and impinging upon observation point 208 are described by Maxwell's wave propagation equations. A complete solution in three dimensions for the wave propagation equations is computationally intense, and currently not feasible. However, in layered media, by taking advantage of radial invariance, Maxwell's equations can be reduced to three independent one-dimensional wave equations via TE and TM decomposition. Matching boundary conditions for a one-dimensional problem can be simplified by solving an analogous transmission line circuit.

A uniform transmission line can be characterized by three parameters: the propagation constant $\gamma$, the characteristic impedance $Z_c$, and the line length l. Voltage and current propagate along the line based on the Telegrapher's equations:

$$\frac{dv}{dz} = -\gamma Z_c i$$

$$\frac{di}{dz} = -\gamma Y_c v + i_s$$

where $i_s$ is the current source density, and $Y_c=1/Z_c$ is the characteristic admittance. The boundary conditions for the transmission line circuit at the source-free interfaces are that voltage and current be continuous, i.e., $v_+=v_-$ and $i_+=i_-$. These conditions are automatically satisfied by enforcing Kirchoff's current law and Kirchoff's voltage law.

In layered media, the potential $\phi$ satisfies the propagation equation $$\left\{\frac{\partial^2}{\partial z^2} - \gamma^2\right\}\phi = -\alpha\phi_E$$

where $\phi_E$ is the source of excitation. $\phi$ satisfies the following boundary conditions at the media interface:

$$\phi_+ = \phi_-$$

$$\beta_+\dot\phi_+ = \beta_-\dot\phi_-$$

where the dot denotes the derivative with respect to z. This is equivalent to solving a transmission line with the same propagation constant. We reduce the problem of solving for $\phi$ to the problem of solving for the voltage on a line with the following transformation.

$$v \sim \phi$$

$$i \sim -\beta\dot\phi$$

$$Y_c \sim \beta\gamma$$

$$i_s \sim \alpha\beta\phi_E$$

The equivalent transmission line circuit is constructed as follows:

1. For terminal layers such as ground, open layers, etc:
   a. For electric or magnetic walls use a short or open circuit;
   b. For an open layer, use a terminating resistor with resistance given by the equivalent characteristic impedance;
   c. For an imperfect layer, use a resistor with resistance given by equivalent surface impedance.
2. For the intermediate layers, use a transmission line with the equivalent characteristic impedance, propagation constant, and length.

Above transmission lines are used for the generation of Green's functions used in this invention as shown in FIG. 1, block 102. These Green's functions will be used in both the near and far field computations. In general, in the spectral domain, a full wave Green's function can be decoupled into three sets of one-dimensional wave equations. Applying Poisson's equation for the static Green's function leads to a one-dimensional wave equation. The concept can be extended to three dimensions. Each of the one-dimensional wave equations and their solutions are equivalent to a transmission line circuit analog. The boundary conditions to be enforced are obtained by solving the equivalent circuit of the transmission line analog.

A Green's function is the response of a physical system due to a point exciting source. More specifically, the Green's function is the underlying solution of the associated partial differential equation. For capacitance extraction problems in layered media the associated equation to be solved is Poisson's equation, i.e., the Green's function G satisfies:

$$\nabla^2 G(z,\rho) = -\frac{1}{2\pi\epsilon\rho}\delta(z')\delta(\rho')$$

where (z,p) and (z',p') are the observation and source points in cylindrical coordinates. The spectral domain Green's function $\tilde{G}$ satisfies:

$$\left(\frac{\partial^2}{\partial z^2} - \gamma^2\right)\tilde{G}(z) = -\frac{1}{2\pi\epsilon}\delta(z').$$

For a fixed spectral number $\gamma$, this equation can be mapped to an equivalent transmission line equation as described above. The value of the Green's function is equal to the voltage along the line.

One set of transmission line equations is sufficient to describe the static Green's functions because of the one dimensional source charge. For full-wave problems, the three-dimensional source current results in three different sets of transmission line equations, each with its own characteristic impedance. Furthermore, because of retardation, the singularities and discontinuities in the spectral domain Green's functions involve additional complications that are not discussed in detail here but that have been successfully solved as described by K. Michalski and J. Mosig in *Multilayered Media Green's Function and Integral Equation Formulation* IEEE Transactions on Antenna and Propagation 45(3):508–519, March 1997.

2) Near Field computation—The Image Method—Real time—blocks 110, 104 and 112

In FIG. 1, a generalized image method for computation of 3D Green's functions for the near field is performed in block 110. This computation is conducted in real time, meaning that a computation has to be made for every point of interest before a final parameter extraction can be obtained. In this invention, the 1/r singularity in the Green's function in the near field is not stored in the database. Instead, a method based on images is used to perform this computation on-line, in real time. The method of images is based on an infinite series expansion which provides a spectral to spatial domain transform. In general, an image method for capacitive parameter extraction in multilayered media is described by W. T. Weeks in "Calculation of Coefficients of capacitance of multiconductor transmission lines in a multiconductor transmission lines in a multilayered dielectric media" *IEEE Transactions on Microwave Theory and Techniques* 18(1) :35–43, January 1970, incorporated herein by reference in its entirety. Its use is usually limited to media with only a small number of layers for the following reasons:

a) For more than two layers, the infinite image series expression is relatively hard to derive and implement;

b) There is no robust convergence testing procedure for the image series. Moreover, in the far field an enormous number of images are required to converge to a reasonable tolerance.

For multilayered media in modern printed or lithographed circuits, the traditional image method is abandoned in this invention because of the above difficulties. Wave-tracing is at generalized image method to obtain all the possible images by inspecting the physical meaning of the spectral domain Green's function. Applying the mechanism in the transient response of transmission line circuits in time domain sheds light on this problem. At initial time $t_o$, a current source generates two initial sinusoidal voltage waves phased 180 degrees apart at the location where a point source is simulated. This location is generally on a conductive layer. The two waves then independently propagate in three dimensional space. If the wave meets an impedance discontinuity, as, for example, when crossing from one layer to another, the wave is split into a reflected wave and a transmitted wave. During the simulation, the energy of the wave is split in accordance with the physical characteristics of the two or more layers forming the structure of the IC. The reflected and transmitted waves then independently propagate through each of the remaining layers that make up the structure to be modeled. Each wave is attenuated and reflected by the splitting process and the distance it travels. Waves passing an observation point are called images. Waves emanating from a single source are generally summed to compute the contribution of images from that particular source. Collecting images from a plurality of sources, associated with circuit element, describes the effect of that circuit element upon an observation point.

The image method for computing interactions at a point from multiple reflecting waves is applicable in this invention only in the near field and not feasible for the far field. The limitation in the far field stems from the exponential growth of images required. For example, a typical MCM-D technology with 5 dielectric layers and a ground plane structure at distance 10 $\mu$m the number of images required to achieve accuracies of $10^{-4}$ at a horizontal distance of $10^{-4}$ meters is 1000. However, at a horizontal distance of 1 mm, the number of images for the same accuracy is 100,000.

2.1 Near Field—Image method—Wave Tracing prioritization—Heap data structure—block 104

In accordance with this invention, a heap data structure method is used to manipulate the results generated from the image method described above to reduce the computational burden in real time. The heap data structure of this invention implements a priority queue to store and retrieve the wave information.

The prior art called for recursively tracing waves until each wave was attenuated through reflection or attenuation to a point where the magnitude of the wave was below a point of significance for a particular simulation. Instead, in accordance with this invention, in block 104, a heap data structure is formed wherein each wave is assigned a key value (KV) which is calculated from the wave's amplitude and distance traveled away from the point of origin, its source. For example, a key value is computed from:

$$KV=f(A/l)$$

where f(A/l) is a function of amplitude A and l, distance traveled by a particular wave through one or more layers, inclusive of reflections. For example, a wave having high amplitude, but reflected across many interfaces, would tend to be weighed less or ignored in the calculation because its contribution to the overall solution is negligible. Using this key value avoids wasting computational resources to trace contributions of waves known from their reflection path and amplitude, as embodied in the key value, to be negligible. The key value avoids computing the image method for waves of deemed of low priority from the geometry of the layered structure.

Waves are dynamically sorted in a Priority Queue (PQ) with the strongest ones (highest KV value) at the top. The pseudo-code for prioritizing waves at a point, following FORTRAN WHILE-IF-THEN logic construct, is as follows:

Insert initial waves in the PQ;
WHILE the last image contribution is not small enough {
   a. Extract the wave at the head of the PQ;
   b. IF the wave passes the observation point then:
      i. accumulate Green's function; record image information;
   c. split the wave into a reflected and a transmitted wave at layer interface;
   d. assign the key to the two new waves;
   e. insert them into the PQ;
}

An important advantage of this heap data structure implementation is that only the dominant waves are traced. If the amplitude of a wave is below a certain value of KV, the wave is not computed. This provides a good stopping criterion thereby reducing the computational load and allowing a trade-off between computational time, memory requirements and accuracy of the final result. For a point, all near field components are summed in real time as shown in block 112.

3. Far field—Computations of inverse 3D Green's functions—blocks 106, 108, 114, 116

As described in ¶1 above, Green's functions solved for a particular structure are derived and solved in the spectral domain. However, the integral equation solution is usually required in the space domain. Hence, transformation from the spectral domain to the space domain is computed. This generally is done by the use of a two-dimensional Fourier transform. The Fourier transform simplifies, due to radial symmetry, to a one dimensional Hankel Transform.

More specifically, for a fixed z and z', if the impedance transfer function of the equivalent transmission line from the source to the observation point is Z, then the space domain Green's function is:

$$G(\rho) = \frac{1}{2\pi\epsilon_0} \int_0^\infty Z(\gamma) J_0(\rho\gamma) d\gamma.$$

This transform is computationally intensive. Although efficient codes such as the Fast Hankel Transform alleviate this problem, it is still prohibitive to perform these computations for a large number of points or when only a short time is available to arrive at a solution.

This subsection discusses the second part of the method of this invention, used to compute the space domain Green's function in the far field. The prior art describes one of the following three techniques for computations in the far field:

a. Discrete complex image. This method approximates the smooth part of spectral domain Green's function by a sum of complex exponentials. However, serious accuracy and stability problems make it impractical for more than two layers b. FFT schemes. These methods enforce Dirichlet or Neumann boundary conditions on a bounding box, and use 2D FFTs to perform the transformation. They require extremely fine sampling to cover sufficient spectral content to achieve reasonable accuracy.

c. Numerical integration. The two dimensional Fourier transform of the Green's function in the spectral domain is reduced to a one-dimensional Hankel transform. Numeric evaluation of this transform, although robust, is relatively computationally intensive, hence time consuming.

In accordance with this invention, Green's function for the far field can be split into two parts: a region near the origin (which may contain poles and branch points) and a smooth tail. For the first part, block 106, the region near the origin, the solution is found by using adaptive Gaussian integration along a contour excluding the poles.

For the second part, block 108, away from the singularity, the tail is smoothly decaying and oscillating when convolved with a Bessel function kernel. The Fast Hankel Transform is used for computing the Hankel Transform from 0 to ∞ of a smooth function $f$ in block 114. In order to apply this technique, the tail is extended to the origin by matching the function and its first few derivatives at the start of the tail with a polynomial. Then it is corrected for the contributions of the polynomial in the initial region.

The Fast Hankel Transform, as shown in FIG. 1, block 114, is a digital filter for evaluating the following integral:

$$f(p) = \int_0^\infty F(k_p) J_k(k_p p) dk_p.$$

$J_k(k_p p)$ is the Bessel Function.

By a change of variables, $p=e^x$, $k_p=e^{-y}$, the integral reduces to a convolution, which is then computed using $$g(x) = \sum_{i=1}^N w_i G(x - a_i)$$

where $g(x)=e^x f(e^x)$, $G(x)=F(e^{-x})$, and where $w_i$ and $a_i$ are sets of weights and abscissa respectively.

3. Generating Green's function database for the far field

A space domain, in contrast with a frequency domain Green's function with radial invariance, has three variables: z, z', and p. For a typical 3D problem every required value cannot be stored because the large number of values required would exceed typical computer memory constraints. Instead, an interpolation strategy in accordance with this invention is used that takes advantage of the fact that the majority of source and observation points lay on a fixed number of sheets rather than on the side walls of a conductor. The database stores the interaction between every pair of sheets.

As shown on FIG. 1, block 122, the database is compressed with a mixed-dimension interpolation scheme. Adaptive Chebyshev interpolation is applied in the radial direction and Lagrange interpolation is used for the vertical direction. Such methods for representing a known set of points in compact fashion using interpolation and polynomial approximation are discussed in *Numerical Methods for Mathematics, Science, and Engineering* by John H. Mathews, ISBN 0-13-624990-6, chapter 4, sections 4.3 (LaGrange approximations), 4.4. (Newton Polynomials) and 4.5 Chebyshev polynomials. The inventors have found that Chebychev adaptive approximations work best.

The accuracy of the interpolation is controlled. For example, the difference between an actual value and an interpolated value is kept at 0.1 percent of the actual value. Generally, the cost of evaluating a Green's function is on the same order as that of the free-space Green's function.

The interpolation method used in block 122 to compress the number of data points in the database descriptive of the layered structure is given by:

a. For sheet to sheet interactions such as between points located on a sheet, use ID interpolation on p.

b. When only one point is on a sheet, but the other is not an a sheet, use 2D interpolation.

c. When neither point is on a sheet use 3D interpolation.

Thus a compressed database is created descriptive of all discretization points within a volume. To simulate an element as shown in FIG. 1 block 120, the far field effects for points descriptive of an element are extracted from the compressed database in accordance with block 118. The near field is computed in accordance with the image method of blocks 110, 104 and 112. The far field and near field are added to obtain matrix M1, which is solved to obtain the final result.

All references cited in this document are incorporated herein by reference in their entirety.

Although presented in exemplary fashion employing specific embodiments, the disclosed structures are not intended to be so limited. Those skilled in the art will also appreciate that numerous changes and modifications could be made to the embodiment describers herein without departing in any way from the invention. These changes and modifications and all obvious variations of the disclosed embodiment are intended to be embraced by the claims to the limits set by law.

What is claimed is:

1. An apparatus for simulating an electronic component said component formed within a plurality of layers each of said layers having radial invariance, said apparatus comprising:

means for dividing said component into a plurality of regions, each of said regions located within one layer of said plurality of layers;

means for computing transmission line equivalents between said regions for regions not located on the same layer;

means for forming an integral system of equations using said transmission line equivalents, said integral system of equations descriptive of the interaction of said regions located on said layers;

means for computing a near field for each of said regions;

means for computing a far field for each of said regions thus generating a database, said database having means for extracting said far field stored within said database for each of said regions, said database computed from said transmission line equivalents; and means for solving said linear system of equations by combining said near field and said far field said far field extracted from said database, to simulate said component.

2. An apparatus as described in claim 1 wherein said means for computing said near field prioritizes said computations.

3. An apparatus as described in claim 1 further comprising means for compressing said database.

4. An apparatus as described in claim 1 wherein said database is compressed using Chebychev interpolation.

5. An apparatus as described in claim 1 wherein said database is compressed using LaGrange interpolation.

6. A method for computing a near field and a far field generated at a point, said point part of an electronic component, said point being within a layered structure having radial invariance, said method comprising the steps of:

forming a transmission line equivalent for said point within said layered structure;

computing said near field component; and computing a far field for said point, said far field stored and compressed in a database for subsequent retrieval;

extracting said far field from said database, said database being descriptive of said structure; and using said far field extracted from said database and said near field for said point to solve an integral system of equations descriptive of said electronic component.

7. The method described in claim 6 wherein said forming step includes a step of forming a Green's function transmission line analog representative of said layered structure.

8. The method described in claim 7 including the step of using adaptive Gaussian integration along a contour excluding poles.

9. The method described in claim 7 including the step of convolving said Green's function transmission line analog with a Bessel function, said transmission line analog further corrected with a polynomial.

10. The method described in claim 9 including the step of using a Fast Hankel Transform for conversion from a spectral domain to a spatial domain.

11. The method described in claim 7 further including the step of using an adaptive Chebyshev interpolation procedure for forming said database containing said far field.

12. The method described in claim 7 further including the step of using a LaGrange interpolation procedure for forming said database containing said far field.

13. The method described in claim 6 including the step of prioritizing computations for said rear field component.

14. The method described in claim 13, wherein said step of prioritizing uses an amplitude and a distance.

15. An apparatus for a near field and a far field generated at a point, said point part of an electronic component, said point part of a layer within a layered structure, said layer having radial invariance, comprising:

means for forming a Green's function transmission line analog representation of said point within said layered structure;

a processor for computing said near field component and for computing said far field component;

memory means for storing said far field component in a database, and compressing said database;

processor means for extracting said far field from said database, said database descriptive of said structure; and simulating said component by combining said far field component extracted from said database and said near field to arrive at a solution of an integral system of equations descriptive of said component.

16. The apparatus described in claim 15 including means for prioritizing computations for said near field.

17. The apparatus described in claim 16, wherein said means for prioritizing said computations use an amplitude and a distance.

18. The apparatus described in claim 15 wherein adaptive Gaussian integration is computed along a contour excluding poles.

19. The apparatus described in claim 15 wherein said transmission line analog is convolved with a Bessel function, and said transmission line analog is further corrected with a polynomial.

20. The apparatus described in claim 15 wherein a Fast Hankel Transform converts results in a spectral domain to a spatial domain.

21. The apparatus described in claim 15 wherein said database containing said far field is compressed using an adaptive Chebyshev interpolation procedure.

22. The apparatus described in claim 15 wherein said database containing said far field is compressed using a LaGrange interpolation procedure.

23. An apparatus for simulating an electronic component formed from a plurality of layers, each of said layers having radial invariance, comprising:

means for dividing said component into a plurality of regions, each of said regions part of one layer of said plurality of layers;

means for computing a plurality of Green's functions transmission line equivalents between said regions, said regions not located on the same layer;

means for storing said plurality of Green's functions transmission line equivalents;

means for computing a near field component for each Green's function;

means for computing a far field for each of said Green's function;

means for storing said far field and compressing said far field into a database;

means for extracting said far field from said database for said regions; and means for combining said far field and said near field for each of said regions to solve an integral system of equations, said integral system of equations used to simulate said component.

24. The apparatus described in claim 23 wherein said means for computing said near field includes means for prioritizing computations for said near field.

25. The apparatus described in claim 24, wherein said means for prioritizing said computations for said near field use an amplitude and a distance.

26. The apparatus described in claim 23 wherein said means for computing said far field includes means for computing adaptive Gaussian integration along a contour excluding poles.

27. The apparatus described in claim 23 wherein said means for computing said far field includes means for convolving said Green's functions with a Bessel function, and means for further correcting said Green's function with a polynomial.

28. The apparatus described in claim 23 including means for for computing a Fast Hankel Transform for converting said far field from a spectral domain to a spatial domain.

29. The apparatus described in claim 23 wherein said means for compressing said database includes an adaptive Chebyshev interpolation means for compressing said database containing said far field.

30. The apparatus described in claim 23 wherein said means for compressing said database includes a LaGrange interpolation means for compressing said database containing said far field.

* * * * *